United States Patent
Lee et al.

(10) Patent No.: US 9,417,375 B2
(45) Date of Patent: Aug. 16, 2016

(54) APPARATUS OF LIGHT SOURCE FOR DISPLAY AND APPARATUS OF DISPLAY USING THE SAME

(71) Applicant: LG Electronics Inc., Seoul (KR)

(72) Inventors: Hyunho Lee, Seoul (KR); Hyouk Kwon, Seoul (KR); Sang-Cheon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/589,665

(22) Filed: Jan. 5, 2015

(65) Prior Publication Data
US 2015/0323728 A1 Nov. 12, 2015

(30) Foreign Application Priority Data

May 9, 2014 (KR) .................. 10-2014-0055499
Jul. 30, 2014 (KR) .................. 10-2014-0097295

(51) Int. Cl.
*G09F 13/04* (2006.01)
*F21V 8/00* (2006.01)
*G02F 1/1335* (2006.01)

(52) U.S. Cl.
CPC ............ *G02B 6/0043* (2013.01); *G02B 6/0061* (2013.01); *G02F 1/133509* (2013.01); *G02F 1/133603* (2013.01); *G02F 1/133615* (2013.01); *G02B 6/0035* (2013.01); *G02B 6/0051* (2013.01); *G02B 6/0065* (2013.01); *G02B 6/0068* (2013.01); *G02F 2001/133614* (2013.01)

(58) Field of Classification Search
CPC .. G02B 6/0043; G02B 6/0035; G02B 6/0061; G02F 1/133603; G02F 1/133509
USPC ........................................ 362/97.1
See application file for complete search history.

(56) References Cited

U.S. PATENT DOCUMENTS

| 2001/0001207 A1 | 5/2001 | Shimizu et al. |
| 2006/0268537 A1 | 11/2006 | Kurihara et al. |
| 2009/0034230 A1 | 2/2009 | Lim et al. |
| 2009/0101930 A1* | 4/2009 | Li ................... F21K 9/135 257/98 |
| 2009/0272998 A1* | 11/2009 | Berben ............... H01L 33/508 257/98 |
| 2009/0296369 A1* | 12/2009 | Xu .................. H01L 33/508 362/84 |
| 2010/0246160 A1* | 9/2010 | Ito ................... G02F 1/133603 362/84 |
| 2010/0321919 A1* | 12/2010 | Yang .................. F21K 9/00 362/84 |
| 2011/0002140 A1 | 1/2011 | Tsukahara et al. |

(Continued)

FOREIGN PATENT DOCUMENTS

| JP | 2009-295501 A | 12/2009 |
| KR | 10-2007-0031814 A | 3/2007 |
| KR | 10-2013-0009024 A | 1/2013 |

*Primary Examiner* — Andrew Coughlin
(74) *Attorney, Agent, or Firm* — Birch, Stewart, Kolasch & Birch, LLP (57) ABSTRACT

An apparatus of light source for display for display according to an exemplary embodiment of the present disclosure may include a light source module configured to generate and emit a light, a light transmission member configured to decrease a luminous flux per unit area and emit the light, by receiving the light from the light source module, a first wavelength conversion part arranged on a light path from the light source module to an emitting surface of the light transmission member to convert a portion of the received light to a light of a predetermined wavelength and emit the light, and a second wavelength conversion part discretely arranged from the first wavelength conversion part on the light path to convert a portion of the received light to a light of a wavelength different from the wavelength of the first wavelength conversion part and emit the light.

14 Claims, 8 Drawing Sheets

(56) References Cited

U.S. PATENT DOCUMENTS

| | | | |
|---|---|---|---|
| 2012/0287624 A1* | 11/2012 | Harbers | F21V 23/005 362/231 |
| 2013/0039050 A1* | 2/2013 | Dau et al. | 362/218 |
| 2013/0265552 A1* | 10/2013 | Yoo et al. | 353/31 |
| 2014/0029238 A1* | 1/2014 | Ito et al. | 362/84 |

* cited by examiner

APPARATUS OF LIGHT SOURCE FOR DISPLAY AND APPARATUS OF DISPLAY USING THE SAME

Pursuant to 35 U.S.C. §119 (a), this application claims the benefit of earlier filing dates and rights of priority to Korean Patent Application No.: 10-2014-0055499, filed on May 9, 2014, and Korean Patent Application No.: 10-2014-0097295, filed on Jul. 30, 2014, the contents of which are hereby incorporated by reference in their entirety.

FIELD OF THE DISCLOSURE

The present disclosure relates to an apparatus of light source for display, and an apparatus of display using the same. Particularly, the present disclosure relates to an apparatus providing a light source to a non-self-luminous display such as an LCD, and a display apparatus using the same.

DISCUSSION OF THE RELATED ART

In general, a liquid crystal display device requires a backlight unit. In the past, a light source such as CCFL had been used. However, various types of LED backlight units are being used as LED usage is increasing recently.

As a light source of the LED backlight unit, a white LED, which includes all the wavelengths of three primary lights (red, green, and blue), is used. Currently, the white LEDs are manufactured by a single-chip method or a multi-chip method. The single-chip method is to obtain a white light by combining a fluorescent material by converting the wavelength of the light from an LED emitting a single-colored light. The single-chip method has an advantage of lower cost over a multi-chip method by combining or mixing at least two LEDs of different colors. In addition, the single-chip method is more convenient for miniaturization.

Figure 12:
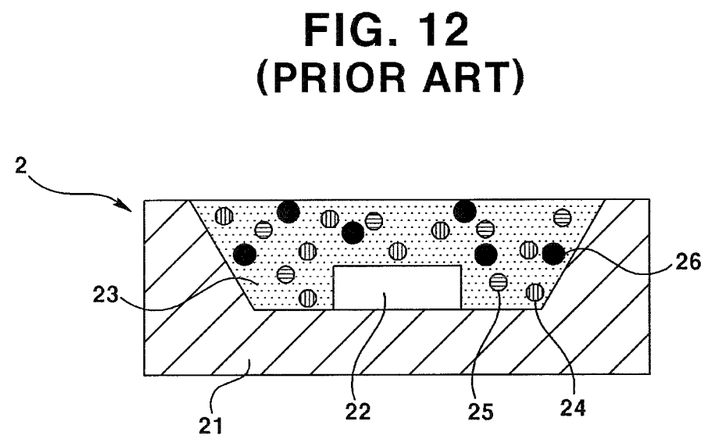
FIG. 12 is a sectional view illustrating an example of a conventional apparatus of light source for display.

FIG. 12 is a sectional view of a white LED according to prior art illustrated in Korean Patent Publication No. 10-2013-0119230. This conventional art is to obtain a resultant white light, by mixing a wavelength conversion material (24) converting a blue light to a green light and a wavelength conversion material (25) converting a blue light to a red light, with a resin packaging part (23).

However, when such different wavelength conversion materials are mixedly used, it is difficult to maintain a uniform mixing ratio over the whole packing part. Thus, there is a problem that uniform white light may not be emitted over the whole light emitting surface. In addition, the adjacent wavelength conversion materials of different kinds often absorb a light emitted from each other to reduce an amount of emitted light of the absorbed color. Therefore, the energy efficiency is also reduced, and the amount of emitted light is relatively less, considering the amount of wavelength conversion material used. In addition, each of the wavelength conversion materials has different heat stability from each other. Thus, a wavelength conversion material of comparatively low heat stability is deteriorated sooner to reduce the color of the light which the corresponding wavelength conversion material has been emitting, due to the LED chip's characteristic of accompanying heat. For example, a quantum dot is in the limelight as a new material substituting the conventional fluorescent materials. However, the quantum dot is deteriorated earlier to be defunctionalized, because the heat stability of the quantum dot is lower compared to other fluorescent materials.

This problem results in degradation of color reproduction ratio of the display, by declining energy efficiency of the backlight or failing to provide the LCD display with balanced three primary lights.

SUMMARY OF THE DISCLOSURE

It is an object of the present disclosure to provide an apparatus of light source for display configured to reduce mutual interference of the different wavelength conversion materials, while using the same.

It is another object of the present disclosure to provide an apparatus of light source for display which is able to minimize the deterioration by heat.

Still another purpose of the present disclosure may be to provide an apparatus of light source for display which enhances the energy efficiency by suppressing the efficiency declination due to absorption of different wavelength conversion materials.

In one general aspect of the present disclosure, there is provided an apparatus of light source for display, the apparatus comprising: a light source module configured to generate and emit a light; a light transmission member configured to decrease a luminous flux per unit area and emit the light, by receiving the light from the light source module; a first wavelength conversion part arranged on a light path from the light source module to an emitting surface of the light transmission member to convert a portion of the received light to a light of a predetermined wavelength and emit the light; and a second wavelength conversion part discretely arranged from the first wavelength conversion part on the light path to convert a portion of the received light to a light of a wavelength different from the wavelength of the first wavelength conversion part and emit the light.

In some exemplary embodiments of the present disclosure, the first wavelength conversion part may be arranged on an incident surface side of the light transmission member, and the second wavelength conversion part may be arranged on an emitting surface side of the light transmission member.

In some exemplary embodiments of the present disclosure, the apparatus of light source for display may further comprise an optical sheet to refract or diffuse a light by being arranged on an emitting surface of the light transmission member, wherein the second wavelength conversion part may be arranged to either precede or follow the optical sheet on a light path. Here, a plurality of the optical sheets may be provided, and the second wavelength conversion part may be arranged between the plurality of the optical sheets.

In some exemplary embodiments of the present disclosure, the apparatus of light source for display may further comprise an optical sheet to refract or diffuse a light by being arranged on an emitting surface of the light transmission member, wherein the second wavelength conversion part may be arranged to either precede or follow the optical sheet on a light path.

In some exemplary embodiments of the present disclosure, the light source module may be discretely arranged either from an upper or lower surface of the light transmission member, the first wavelength conversion part may be arranged on an emitting surface side of the light source module, and the second wavelength conversion part may be arranged on either an incident or an emitting surface of the light transmission member.

In some exemplary embodiments of the present disclosure, at least one of the first wavelength conversion part and the second wavelength conversion part may be a film-shaped member, and the apparatus may further include a protective film coated on at least one surface of the film-shaped member.

In some exemplary embodiments of the present disclosure, the second wavelength conversion part may be a coated layer formed on a surface of the light transmission member.

In some exemplary embodiments of the present disclosure, each fragment of the second wavelength conversion part may function as an optical pattern formed in the light transmission member by being divided into a plurality of fragments.

In some exemplary embodiments of the present disclosure, the light source module may include a light emitting diode, a housing mounted with the light emitting diode and formed with a reflector around the light emitting diode, and a circuit board coupled to the housing to apply a current to the light emitting diode, and the first wavelength conversion part may be a sealing member filled in with the reflector.

In some exemplary embodiments of the present disclosure, the first wavelength conversion part may be arranged on a position to precede the light transmission member, and the second wavelength conversion part may convert an incident light to a light of wavelength shorter than a wavelength of the first wavelength conversion part, by being arranged on a position to follow the light transmission member.

In some exemplary embodiments of the present disclosure, the first and the second wavelength conversion parts may include at least one selected from a fluorescent material or a quantum dot.

In some exemplary embodiments of the present disclosure, the fluorescent material may include any one selected from a group consisting of YAG (Yttrium Aluminium Garnet) fluorescent substance, LuAG (Lutetium Aluminium Garnet) fluorescent substance, SiAlON fluorescent substance (such as Alpha SiAlON, Beta and SiALO), Sulfide fluorescent substance, KSF fluorescent substance, Nitride fluorescent substance, Silicate fluorescent substance, and any combination thereof.

In some exemplary embodiments of the present disclosure, the quantum dot may include any one selected from a II-VI group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, HgZnSTe, and any combination thereof, or any one selected from a III-V group consisting of GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, InAlPAs, and any combination thereof.

In some exemplary embodiments of the present disclosure, a ratio (A2/A1) of an area of a plane where the second wavelength conversion part converts and emits a light (A2) to an area of a plane where the first wavelength conversion part converts and emits a light (A1) may be 11~10,000.

In some exemplary embodiments of the present disclosure, an apparatus for display may be realized by comprising the apparatus of light source for display.

According to an exemplary embodiment of the present disclosure, the optical loss may be minimized, because different wavelength materials are discretely arranged from each other to suppress mutual interference. Thus, the color reproductivity may be improved.

In addition, according to an exemplary embodiment of the present disclosure, deterioration of the wavelength conversion materials may be delayed as much as possible, because the degree of freedom to arrange the wavelength conversion material having comparatively lower heat stability farther from the light emitting diode is provided.

In addition, an apparatus of light source for display according to an exemplary embodiment of the present disclosure may be less affected by change of the backlight unit design, because the present disclosure may be applied not only to edge-type backlight units but also to direct-type backlight units.

DETAILED DESCRIPTION

Hereinafter, an apparatus of light source for display according to an exemplary embodiment of the present disclosure will be described in detail. The figures accompanied are provided only for detailed description of exemplary embodiments of the present disclosure. Therefore, the technical scope of the present disclosure is not limited to the figures illustrated.

In addition, the same number is given to an identical or corresponding component regardless of figure symbols, and the overlapped description thereof will be omitted. Scales and shapes of each component member illustrated for convenience of description may be exaggerated or minimized.

Meanwhile, the terms including ordinal numbers such as "first" or "second" may be used for description of various elements. However, the elements shall not be limited by such the terms. The terms are used merely to distinguish a particular element from another element.

Figure 1:
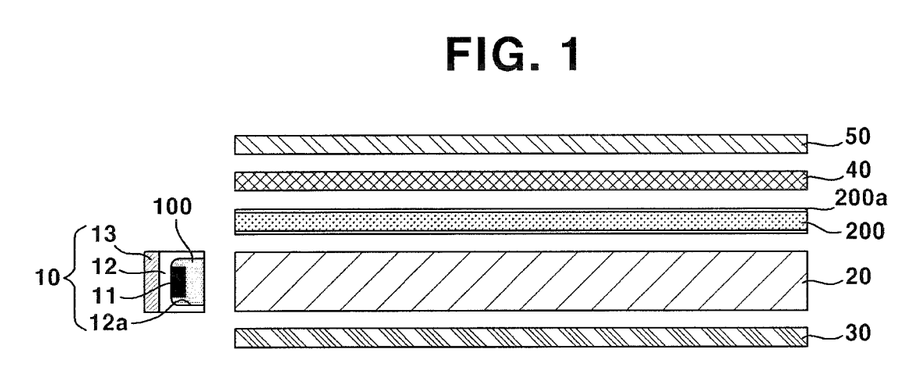
FIG. 1 is a sectional view illustrating a schematic structure of an apparatus of light source for display according to a first exemplary embodiment of the present disclosure.
Figure 2:
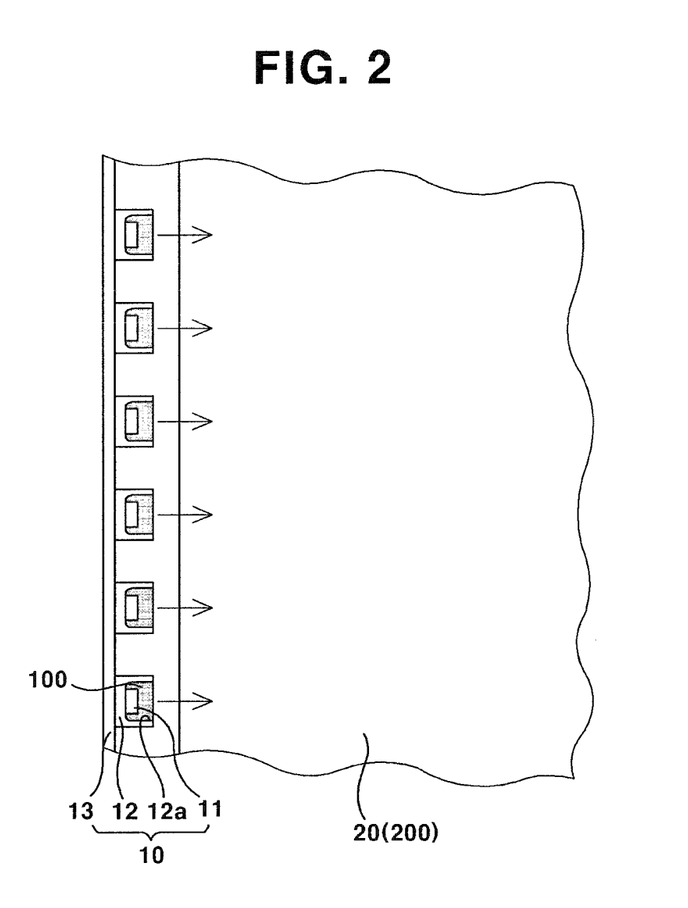
FIG. 2 is a partial plan view of the first exemplary embodiment of FIG. 1.
Figure 3:
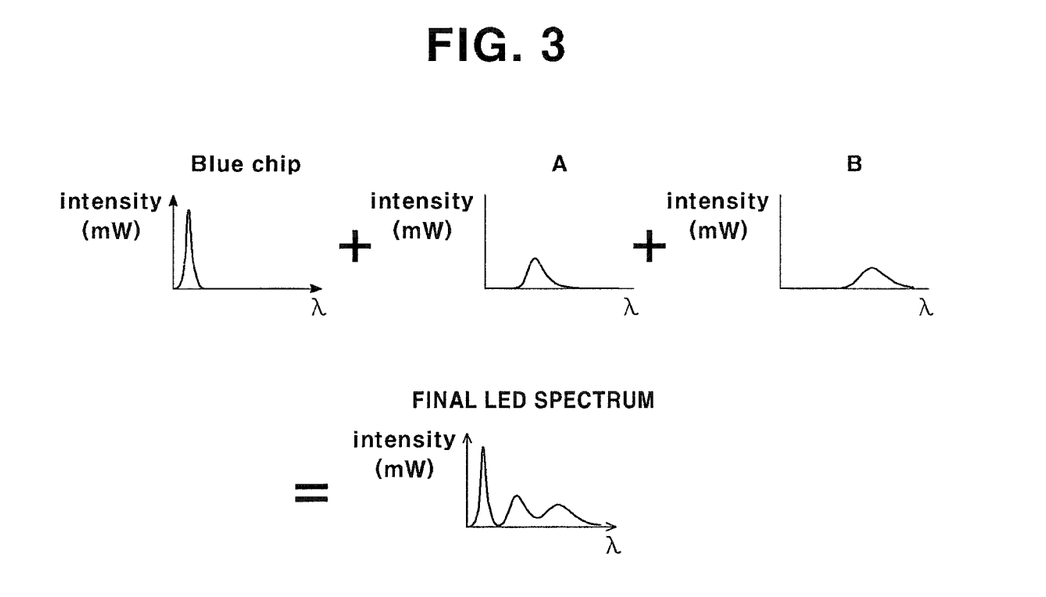
FIG. 3 is a graph illustrating an example of spectrum formation of an apparatus of light source for display according to an exemplary embodiment of the present disclosure.
Figure 4:
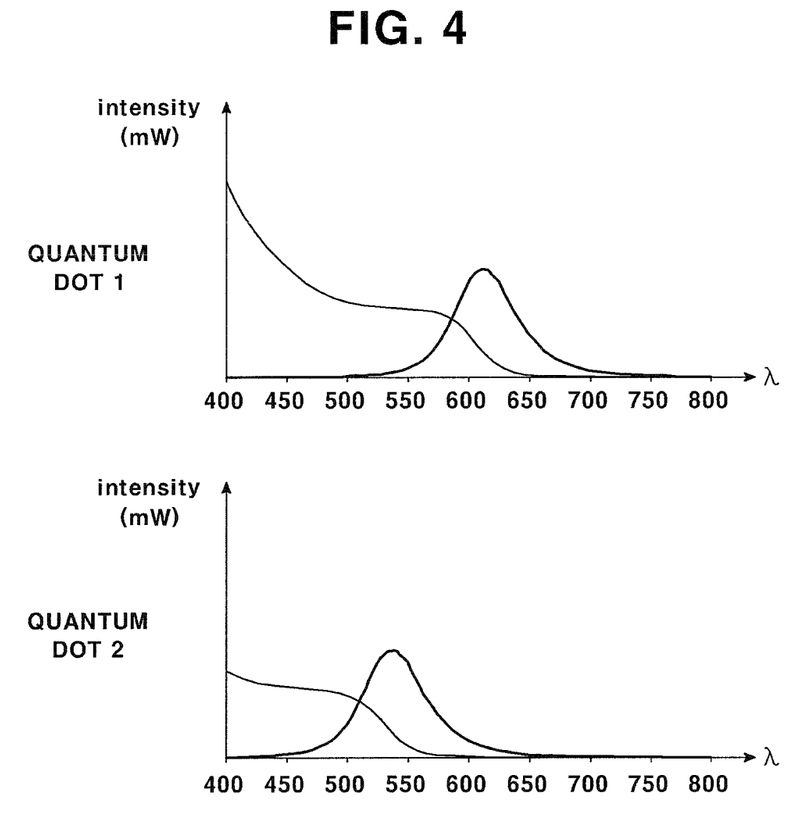
FIG. 4 is a graph illustrating optical characteristics of quantum dots of an apparatus of light source for display according to an exemplary embodiment of the present disclosure.

FIG. 1 is a sectional view illustrating a schematic structure of an apparatus of light source for display according to a first exemplary embodiment of the present disclosure; FIG. 2 is a partial plan view of the first exemplary embodiment of FIG. 1; FIG. 3 is a graph illustrating an example of spectrum formation of an apparatus of light source for display according to an exemplary embodiment of the present disclosure; and FIG. 4 is a graph illustrating optical characteristics of quantum dots of an apparatus of light source for display according to an exemplary embodiment of the present disclosure.

As illustrated in FIG. 1, an apparatus of light source for display according to a first exemplary embodiment of the present disclosure may include a light source module (10), a light transmission member (20), a reflecting member (30), an optical sheet (40), a first wavelength conversion part (100), and a second wavelength conversion part (200). The apparatus of light source for display may be arranged a lower side of a display module (50). Here, the display module refers to, for example, a panel filled with liquid crystal in a LCD display.

The light source module (10) may generate and emit a light, and may include a light emitting diode (11), a housing (12), and a circuit board (13).

The light emitting diode (11) may function as a light source, and may emit a light of a particular wavelength. Here in this exemplary embodiment, the light emitting diode (11) may include a blue chip and may emit a light of blue-color wavelength. However, the wavelength of the light emitted by the light emitting diode (11) is not limited to a blue color. A light emitting diode emitting a light of violet-color or ultraviolet may be used.

The housing (12) may form a package by supporting the light emitting diode (11). The housing (12) may include a reflector (12a) made of a metal or a material that easily transfer heat. The reflector (12a) may be mounted with a light emitting diode (11). The light emitting diode (11) may be arranged at a center part of the reflector (12a), and may direct the light from the light emitting diode (11) to the light transmission member (20) by forming a reflecting layer on an inner circumferential surface of the reflector (12a).

The circuit board (13) may include a controller to control the light emitting diode (11) and an inverter to supply a power source to the light emitting diode (11). The circuit board (13) may also support the housing (12).

The light transmission member (20) has a light incident from the light source module (10) to a side surface thereof. The light transmission member (20) diffuses the light into a surface light source so as to be emitted from the other side surface. The luminous flux per unit area of the light passing through the light transmission member (20) may be reduced in this process. This is an optical process necessary to convert a point light source or line light source to a surface light source. In general, the backlight as a light source device for display may be divided into an edge type and a direct type. In the edge type, a light source module is arranged on a side forming the thickness of the light transmission member. On the other hand, in the direct type, a light source module is disposed under the light transmission member arranged horizontally. As required characteristics for each of the two types is different, a light guide plate is used as the light transmission member (20) in the edge type, while a light diffusion plate is used as the light transmission member (20) in the direct type. Referring to FIGS. 1 and 2, it is illustrated that a light source module (10) is arranged on a side forming the thickness of the light transmission member (20). This means that the exemplary embodiment is for the edge type backlight unit. Thus, the light transmission member (20) in this particular exemplary embodiment corresponds to the light guide plate. Meanwhile, in the light transmission member (20), a side surface on which a light is incident may be referred to as a 'incident surface', while the other side surface from which the light is emitted may be referred to as a 'emitting surface'. In the edge type, one of the surfaces forming the thickness (that is, a 'thickness surface') of the light transmission member (20) becomes the incident surface, while one of the broadest two surfaces (that is, a 'plate surface') which are adjacent to the thickness surface becomes the emitting surfaces. In the direct type, each of the facing two plate surfaces becomes the incident surface and the emitting surface, respectively.

The light transmission member (20) provided as a light guide plate converts the light received from the thickness surface to a plate surface light. For this process, the light transmission member (20) may include a diffusion agent inside thereof. In addition, an optical pattern functioning as a reflecting surface or a lens may be formed inside the light transmission member (20), in order to refract, diffuse, or focus the light. Here, a poly methyl meth acrylate (PMMA) may be used as a material for the light transmission member (20), because the PMMA is a plastic having a high light transmittance with a good weatherability.

In the direct type backlight, the light transmission member (20) may be formed of a diffusion plate. This will be described with another exemplary embodiment.

The reflecting member (30) reflects a light, by being arranged on the opposite plate surface to the emitting surface of the light transmission member (20). This is in order to reflect again a light that deviates from the purposed light path due to diffusion, reflection, or refraction during passing through the light transmission member (20) from the light source module (10), and to direct the light to the emitting surface. Here, the light path means the average center line of the luminous flux from the light source module (10) to the emitting surface of the light transmission member (20). In this case, the reflecting member (30) may be a subsidiary structure to enhance the light efficiency of the apparatus of light source for display. However, part of the light passing through the light transmission member (20) may be designed to be directed preferentially to the reflecting member (30) according to the purpose to equalize the brightness distribution and to enhance the overall luminous intensity.

The optical sheet (40) is used for the purpose of enhancing brightness uniformity. The optical sheet (40) may be disposed on the emitting surface side of the light transmission member (20). The optical sheet (40) may diffuse or distract the incident light through the light transmission member (20) or the reflecting member (30). The optical sheet (40) may be used by selection or combination of diffusion film, prism film, etc.

The display module (50) may be a panel filled with liquid crystal in a LCD (Liquid Crystal Display). The display module (50) shows images by selectively transmitting, blocking or filtering the light that passed through the light transmission member (20) or the optical sheet (40). The apparatus of light source for display according to an exemplary embodiment of the present disclosure may be eventually for providing a surface light source to the display module (50). Thus, the display module (50) itself is not essential for the present disclosure.

The first wavelength conversion member (100) includes a first wavelength conversion material to convert the incident light to the light of a predetermined color. As the material to convert the wavelength, a fluorescent material or a quantum dot may be used. The first wavelength conversion material exists as a particle, which may form the first wavelength conversion member (100) as a form of mixture and distribution in a parent material such as light transmitting resin or rosin.

The fluorescent material as the first wavelength conversion material may be any one selected from a group consisting of YAG (Yttrium Aluminium Garnet) fluorescent substance, LuAG (Lutetium Aluminium Garnet) fluorescent substance, SiAlON fluorescent substance (such as Alpha SiAlON, Beta and SiALO), Sulfide fluorescent substance, KSF fluorescent substance, Nitride fluorescent substance, Silicate fluorescent substance, and any combination thereof.

Especially, among the wavelength conversion materials, the quantum dot is a kind of nano-materials, which may be formed of a center body in a size of 2~15 nano meter and a shell made of zinc sulfide. The surface outside of the shell may have generally a size of 1015 nano meter, because a polymer coating is performed. Otherwise, a variety of materials may be used as a material for the quantum dot. For example, the quantum dot may include any one selected from a II-VI group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, HgZnSTe, and any combination thereof, or any one selected from a III-V group consisting of GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, InAlPAs, and any combination thereof. A quantum dot formed by combination of the above materials may form the first wavelength conversion material according to the demand. The first wavelength conversion material may be formed not only of the quantum dot but also of a combination with the aforementioned fluorescent materials.

The quantum dot generates a strong fluorescence in a predetermined wavelength band. The light from the quantum dot is emitted whereby the unstable electrons are descending from the conduction band to the valence band. Here, the emitted fluorescence may be a light of shorter wavelength as the particle of the quantum dot is smaller, while the emitted fluorescence may be a light of longer wavelength as the particle of the quantum dot is bigger. Therefore, the light may be dispersed in a desired wavelength band by controlling the size of quantum dot particle.

The first wavelength conversion part (100) may be installed in the light source module (10). For example, as illustrated in FIG. 1, the first wavelength conversion part (100) may be formed of the hardened resin filling the front surface and surroundings of the light emitting diode (11) installed in the center of the reflector (12a). That is, the first wavelength conversion part (100) may be formed of the sealing member used to form the light emitting diode package. The first wavelength conversion material included in the first wavelength conversion part (100) may absorb a portion of the light in a blue wavelength area emitted from the light emitting diode (11) and may emit a light of different wavelength.

The second wavelength conversion part (200) converts the light that passed through the light transmission member (20) or the reflecting member (30), and may be disposed on the emitting surface side of the light projecting member (20). The second wavelength conversion part (200) also includes the second wavelength conversion material to convert the light to an ingredient of a particular wavelength area. The second wavelength conversion material may also be the fluorescent material or the quantum dot, as exampled with regard to the first wavelength conversion material. However, the second wavelength conversion material may convert the light to a color different from the color of the first wavelength conversion material. For example, the first wavelength conversion material may convert the light to green wavelength area, when the second wavelength conversion material converts the light to red wavelength area. The second wavelength conversion part (200) is disposed at the latter position on the light path. Therefore, the second wavelength conversion part (200) is disposed at the position of lower luminous flux. In addition, the second wavelength conversion part (200) is required to be discretely arranged from the first wavelength conversion part (100) on the light path. Here, the being discretely arranged may be spatial discretion, or may be an arrangement where the first wavelength conversion part (100) is disposed at the former part of the light transmission member (20) and the second wavelength conversion part (200) is disposed at the latter part of the light transmission member (20), respectively. The second wavelength conversion part (200) may be a film-shaped member. The member is formed whereby the second wavelength conversion material is mixed to the light transmitting resin and formed as a shape of film. When the optical sheet (40) is provided, the second wavelength conversion part (200) may be disposed at the former part of the optical sheet (40), that is, between the light transmission member (20) and the optical sheet (40), as illustrated in FIG. 1. However, the second wavelength conversion part (200) may be disposed at the latter part of the optical sheet (40). Further, when a plurality of optical sheet (40) is provided, the second wavelength conversion part (200) may be disposed between the plurality of optical sheets (40).

FIG. 3 is a graph describing the effect of the first wavelength conversion part (100) and the second wavelength conversion part (200), when the light source module (10) is a blue chip emitting blue color. The most left graph among the graphs shows the wavelength of the light emitted from the blue chip, where the wavelength of light is x-axis and the intensity is y-axis. The graph shows that the intensity of light is focused to the comparatively short wavelength band, that is, to the blue visible light area. Graph A shows the intensity according to the wavelength of light generated by the first wavelength conversion part (100). The graph shows that the first wavelength conversion part (100) absorbs a portion of the blue light incident from the blue chip, and converts the light to a longer wavelength, for example, to a light in green visible area, and emits the light. Graph B shows the intensity according to the wavelength of light generated by the second wavelength conversion part (200) disposed at the latter part. The second wavelength conversion part (200) absorbs a portion of the blue light incident from the blue chip, and also converts the light to a longer wavelength, for example, to a light in red visible area, and emits the light. The mixed light arrives at the last end of the light path, that is, at the display module (50). The blue color of the blue chip, the green color emitted from the first wavelength conversion part (100), and the red color emitted from the second wavelength conversion part (200) are mixed to form the final LED spectrum as illustrated in the figure. This is a white colored light as a mixed light of blue, green, and red.

Meanwhile, according the present exemplary embodiment, each of the first and the second wavelength conversion part (100)(200) converts the light so that one wavelength ingredient is generated at one time. On the contrary, in a conventional art, when using a light source of blue wavelength area, two kinds of wavelength conversion materials are mixed in a member in order to obtain green and red light. The light has been converted at once to red and green wavelength areas through the member. However, when the light is converted all at once likewise, the efficiency of the optical system may be declined, because the different wavelength conversion materials mutually interfere to decline the optical efficiency when the different wavelength conversion materials are mixed together. For example, when the first wavelength conversion material and the second wavelength conversion material are mixed in a member, the two different wavelength conversion materials coexist by being adjacent to each other. Thus, the ratio where the light generated by the first wavelength conversion material is absorbed by the adjacent other wavelength conversion material may be increased.

Especially, when the two kinds of wavelength conversion materials are both quantum dots, the effect of wavelength conversion characteristic of the quantum dot is required to be considered. FIG. 4 is a graph illustrating two kinds of quantum dots where the absorption spectrum is a thick line and the emitting spectrum is a thin line. Referring to the absorption and emitting spectrum, quantum dot 1 absorbs a light of wavelength 400~580 nm and emits the light of red area having the maximum brightness at around 620 nm wavelength. Quantum dot 2 absorbs a light of wavelength 400~520 nm and emits the light of green area having the maximum brightness at around 540 nm wavelength. However, when looking the absorption spectrum of the two quantum dots, a portion of the light of wavelength band which the quantum dot 2 is emitting belongs to the wavelength band which the quantum dot 1 is absorbing. Thus, when the quantum dot 1 and the quantum dot 2 are coexisting, the quantum dot 1 may absorb again a portion of the light the adjacent quantum dot 2 converted and emitted. The frequency becomes higher as the quantum dot 1 and the quantum dot 2 are adjacent closer.

Therefore, the first wavelength conversion part (100) and the second wavelength conversion part (200) are required to be discretely arranged from each other on the light path. Especially, when the first wavelength conversion material and the second wavelength conversion material is formed of quantum dots of different size, respectively, the first wavelength conversion material disposed at the former position on the light path is required to be arranged to emit a light of longer than the light emitted by the second wavelength conversion part disposed at the latter position on the light path. For example, when the light source module (10) emits a light of blue color, the first wavelength conversion material is required to emit a light of red color, and the second wavelength conversion material is required to emit a light of green color. This is a measure to minimize the situation where the second wavelength conversion material disposed at the latter position on the light path absorb the light emitted from the first wavelength conversion material when the first wavelength conversion material emits a light of relatively shorter wavelength.

Therefore, in the present exemplary embodiment, the first wavelength conversion part (100) may be on the side of the light emitting diode (11) which is the light source. As a separate member, the second wavelength conversion part (200) may be discretely arranged from the first wavelength conversion part (100). Based on the position of the light transmission member, the first wavelength conversion part (100) precedes the light transmission member (20) on the light path, while the second wavelength conversion part (200) follows the light transmission member (20). Here, when the light transmission member (20) is a light guide plate, the possibility where the light emitted from the second wavelength conversion part (200) is absorbed by the first wavelength conversion material of the first wavelength conversion part (100) may be minimized due to the characteristic of the optical structure of diffusing the light to a surface light source.

According to this structure, only one kind of wavelength conversion material is included in the same member. As illustrated in FIG. 3, in the first and the second wavelength conversion parts (100) (200), the wavelengths are respectively converted to red and green wavelength area in regular sequence. Thus, the spectrum of the final light source module (10) may be naturally formed so that the light efficiency of the backlight unit may be improved.

Meanwhile, the wavelength conversion material having weaker heat stability among each of the wavelength conversion materials of the first and the second wavelength conversion parts (100) (200), for example, the second wavelength conversion material, may be formed as a shape of a film and may be spaced by a certain distance from the light source module (10). On the other hand, the wavelength conversion material having relatively higher heat stability, for example, the first wavelength conversion material, may be formed as a shape of a packaging directly at the light source module (10). The lifespan and reliability of the backlight unit may be enhanced through this measure.

Even though the second wavelength conversion material having weaker heat stability is arranged by being spaced from the light source module (10), there is still a concern for deterioration of the second wavelength conversion material due to heat conduction by the structure of the light source apparatus. Thus, in order to prevent deterioration of the protective film due to heat and, in addition, due to oxygen and moisture, a protective film (200a) may be formed, by coating at least one surface of the both surfaces of the second wavelength conversion part (200) in a shape of a film with a synthetic resin material, or by attaching a synthetic resin film. The protective film (200a) may be applied not only in the present exemplary embodiment, but also in other embodiments to be described afterwards. When the first wavelength conversion part (100) is provided in a shape of a film, the protective film (200a) may be applied thereto.

According to an exemplary embodiment of the present disclosure, a backlight module for a LCD module having high efficiency and high color reproductivity may be provided. In addition, the reliability and optical efficiency may be improved by arranging discretely the first and the second wavelength conversion materials having at least two different characteristics.

FIGS. 5 to 10 illustrate various exemplary embodiments of the apparatus of light source for display according to the present disclosure.

Figure 5:
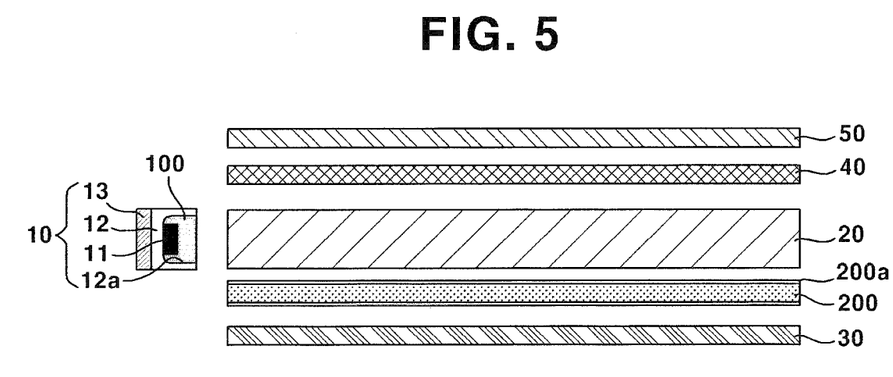
FIG. 5 is a sectional view illustrating a schematic structure of an apparatus of light source for display according to a second exemplary embodiment of the present disclosure.

FIG. 5 is a sectional view illustrating a schematic structure of an apparatus of light source for display according to a second exemplary embodiment of the present disclosure. In the second exemplary embodiment, the second wavelength conversion part (200) is arranged at a position different from the first exemplary embodiment. Especially, the reflecting member (30) may be provided in the edge type backlight. The reflecting member (30) directs the light to be incident to the emitting surface, by reflecting the light which does not direct to the emitting surface of the light transmission member (20) (that is, to the optical sheet (40) and the display module (50)) but directs to the opposite side whereby the light from the light source module (10) has been refracted, reflected, or diffused while passing through the light transmission member (20). To purposely increase the amount of light directing to the reflecting member according to the optical pattern of the light transmission member (20) is also an aspect of the backlight design. In summary, the second wavelength conversion member (20) may be made of a member in a film shape and may be arranged between the light transmission member (20) and the reflecting member (30).

Figure 6:
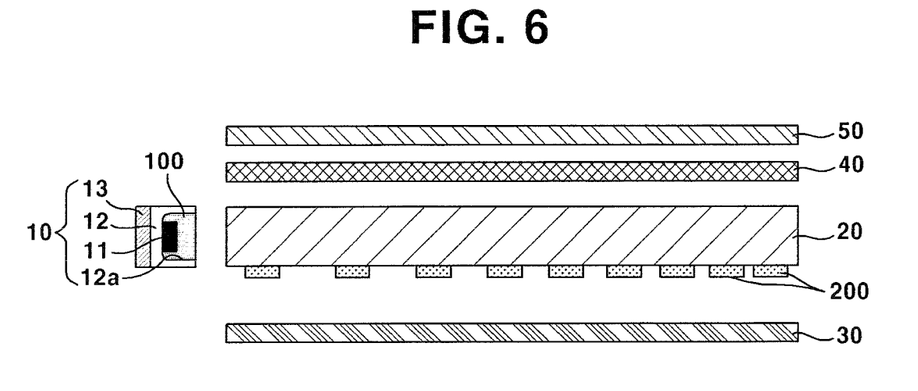
FIG. 6 is a sectional view illustrating a schematic structure of an apparatus of light source for display according to a third exemplary embodiment of the present disclosure.

FIG. 6 is a sectional view illustrating a schematic structure of an apparatus for display according to a third exemplary embodiment of the present disclosure. As the previous second exemplary embodiment, a reflecting member (30) is provided in the third exemplary embodiment of the present disclosure. The second wavelength conversion member (20) may be arranged between the light transmission member (20) and the reflecting member (30). However, in the third exemplary embodiment of the present disclosure, the second wavelength conversion member (200) is not made of a film-shaped member, but of a coated layer attached and formed on the surface facing the reflecting member (30) of the light transmission member (20). The coated layer may be formed by printing or coating the resin mixed with the second wavelength conversion material on the light transmission member (20).

Especially, in FIG. 6, the coated layer is illustrated to be arranged intermittently by being divided into a plurality of fragments. In addition, the intervals between these fragments are illustrated to be not identical to each other. This is similar to the arrangement status which may be observed when an optical pattern such as a lens is formed on the surface of the light transmission member (20). That is, each of the fragments of the second wavelength conversion part (200) may be formed by mixing the second wavelength conversion material with the resin which is used in printing the optical pattern when the optical pattern is formed on the surface of the light transmission member (20) by a method such as printing. Thus, the fragments may also function as the optical pattern. The exemplary embodiment of forming the second wavelength conversion layer as a coated layer where the coated layer may substitute the film shaped member of the second wavelength conversion part (200) arranged adjacent to the light transmission member (20) may be applied not only to the present exemplary embodiment but also other exemplary embodiments. In addition, the first wavelength conversion part (100) may also be formed as a film shaped member or a coated layer.

Figure 7:
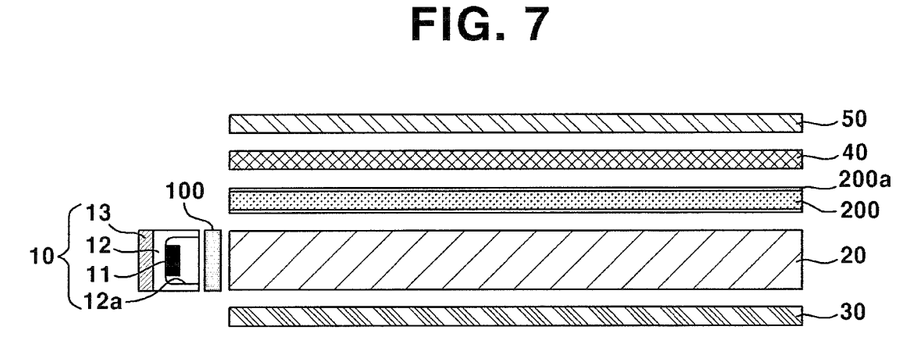
FIG. 7 is a sectional view illustrating a schematic structure of an apparatus of light source for display according to a fourth exemplary embodiment of the present disclosure.

FIG. 7 is a sectional view illustrating a schematic structure of an apparatus for display according to a fourth exemplary embodiment of the present disclosure. In the fourth exemplary embodiment of the present disclosure, the second wavelength conversion part (200) is the same as that of the first exemplary embodiment of the present disclosure. However, the first wavelength conversion part (100) is different. That is, the first wavelength conversion part (100) is formed of a film shaped member, and is arranged between the light source module (10) and the light transmission member (20). When the first wavelength conversion part (100) is made of a film shaped member, the structure corresponding to the protective film (200a) according to the first exemplary embodiment of the present disclosure may be applied to the first wavelength conversion part (100).

Figure 8:
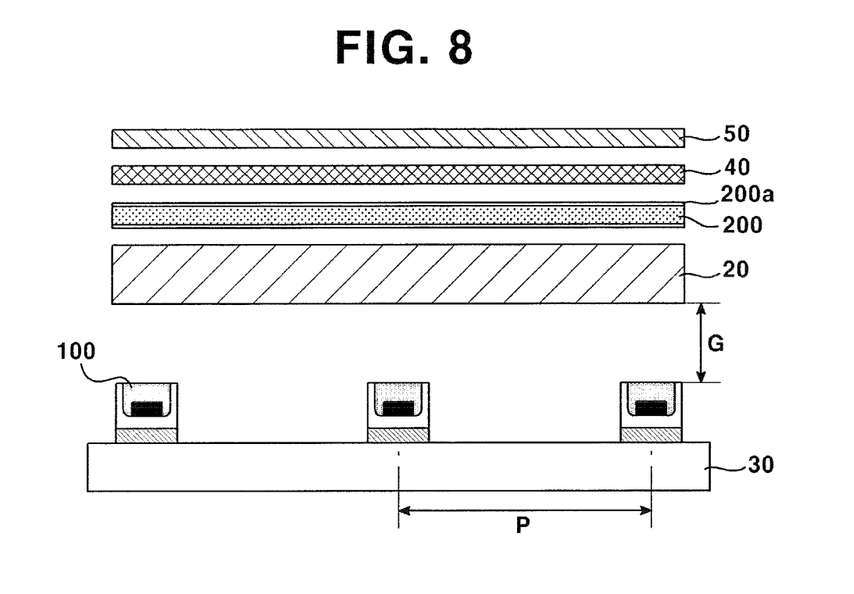
FIG. 8 is a sectional view illustrating a schematic structure of an apparatus of light source for display according to a fifth exemplary embodiment of the present disclosure.
Figure 9:
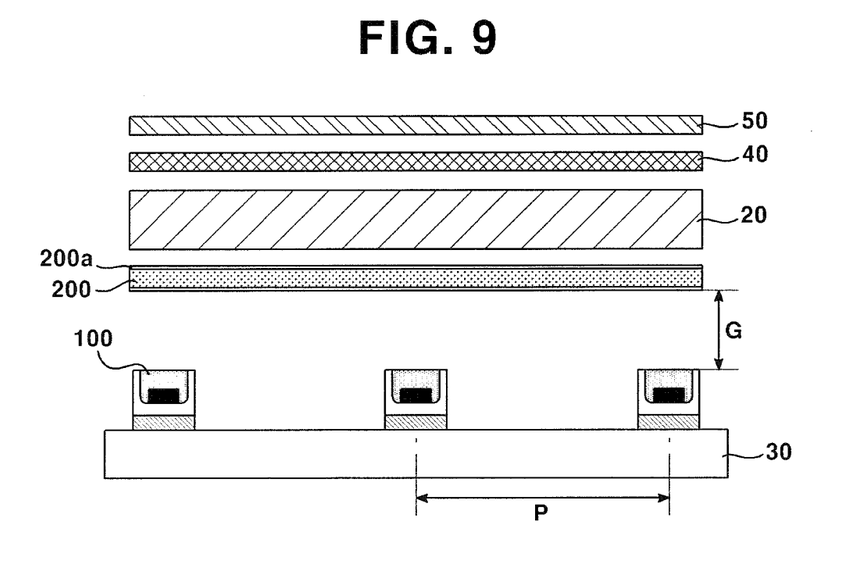
FIG. 9 is a sectional view illustrating a schematic structure of an apparatus of light source for display according to a sixth exemplary embodiment of the present disclosure.
Figure 10:
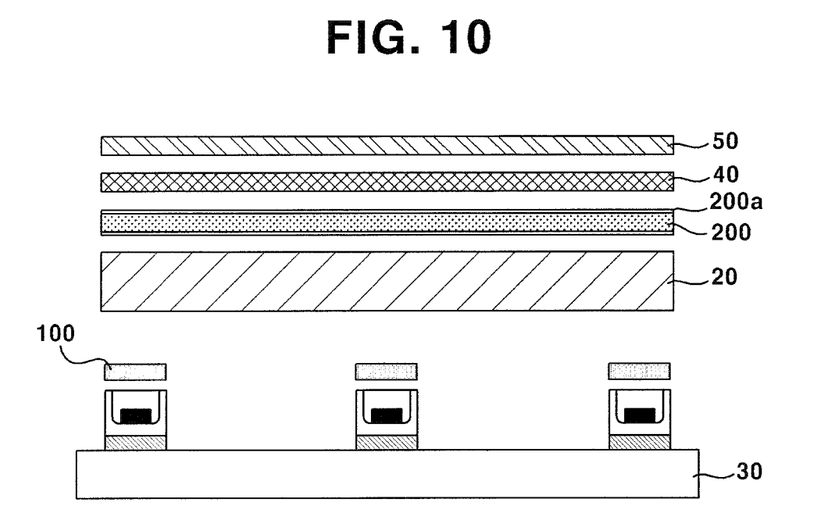
FIG. 10 is a sectional view illustrating a schematic structure of an apparatus of light source for display according to a seventh exemplary embodiment of the present disclosure.

FIG. 8 is a sectional view illustrating a schematic structure of an apparatus for display according to a fifth exemplary embodiment of the present disclosure. In the previous first to fourth exemplary embodiment of the present disclosure, the light source module is the edge type backlight disposed on the thickness surface of the light transmission member (20). In the fifth exemplary embodiment of the present disclosure, the light source module is the direct type backlight disposed on the plate surface of the light transmission member (20). For example, the light source module (10) may be either over or under the light transmission member arranged horizontally. In FIGS. 8 to 10, the light source module (10) is illustrated to be arranged under the light transmission member (20). However, this is merely for convenience of description. The light source module (10) is illustrated to be arranged over the light transmission member (20). It is apparent that the optical sheet (40) should be arranged under the light transmission member (20) in this case. In either case, the light transmission member (20) may be generally formed of a light diffusion plate to diffuse a light. In addition, on the contrary to the edge type, the structure corresponding to the reflecting member (30) is not essential. However, a predetermined interval (G) is required to be maintained between the light source module (10) and the light transmission member (20). The interval (G) may be over a pitch (P) between each of the light emitting diodes (11), unless an additional optical system is brought. In FIGS. 9 and 10 as well as in FIG. 8, the interval (G) between the light source module (10) and the light transmission member (20) is illustrated to be less than the pitch (P) between each of the light emitting diodes (11). However, this is merely for convenience of description. In the fifth exemplary embodiment, the first wavelength conversion part (100) is formed of a sealing member of LED package, as in the first to third exemplary embodiment. In addition, the second wavelength conversion part (200) may be a film shaped member and may be arranged between the light transmission member (20) and the optical sheet (40).

FIG. 9 is a sectional view illustrating a schematic structure of an apparatus for display according to a sixth exemplary embodiment of the present disclosure. The one aspect of the sixth exemplary embodiment different from the previous fifth exemplary embodiment is that the position of the second wavelength conversion part (200) has been moved to the plate surface side facing the light source module (10) of the light transmission member (20). In this case, the first wavelength conversion part (100) and the second wavelength conversion part (200) may be discretely arranged from each other by an interval corresponding to the interval (G) between the light transmission member (20) and the light emitting diode (11). The light from the light source module (10) has been diffused while proceeding up to the interval (G) between the light source module (10) and the light transmission member (20). Thus, the luminous flux of the light incident to the second wavelength conversion part (200) is reduced compare to the luminous flux of the light passing through the first wavelength conversion part (100).

FIG. 10 is a sectional view illustrating a schematic structure of an apparatus for display according to a seventh exemplary embodiment of the present disclosure. The one aspect of the seventh exemplary embodiment different from the previous fifth exemplary embodiment is, that the first wavelength conversion part (100) is not formed of a sealing member of LED package, but formed of a film shaped member arranged on the emitting surface of the light emitting diode (11). In FIG. 10, the first wavelength conversion part (100) is illustrated to be arranged in front of the emitting surface of the light emitting diode (11) by being divided into a plurality. However, the first wavelength conversion part (100) may be formed as a one piece of film shaped member, and may further include a supporting substance to consecutively support the plurality of first wavelength conversion parts (100). In this case, light transmitting film or ITO glass may be used as the support substance. In the present exemplary embodiment, the first wavelength conversion part (100) and the second wavelength conversion part (200) are discretely arranged by a spatial interval corresponding to the interval (G) between the light transmission member (20) and the light emitting diode (11). Meanwhile, in the present exemplary embodiment, the second wavelength conversion part (200) is illustrated to be arranged between the light transmission member (20) and the optical sheet (40). However, as illustrated in FIG. 9, the alteration where the second wavelength conversion part (200) is arranged on the surface facing the light source module (10) of the light transmission member (20) may be possible.

In all the exemplary embodiments in the above, the first wavelength conversion part (100) is arranged relatively closer to the light source module (10), and the second wavelength conversion part (200) is arranged relatively farther from the light source module (10). This means that the luminous flux per unit area passing through the second wavelength conversion part (200) is lesser than the luminous flux per unit area passing through the first wavelength conversion part (100). When a wavelength conversion material emits a light converted to different wavelength with the incident light as an energy source, the emitted light hardly has directivity. Such structural relationship between the first and the second wavelength conversion part (100) (200) is a result of consideration for minimizing the frequency where the light converted and emitted from the second wavelength conversion part (200) redirects to the first wavelength conversion part (100) to be absorbed by the first wavelength conversion material. In addition, according to such structural characteristic, the wavelength conversion material having weaker heat stability may be the second wavelength conversion material, and the wavelength conversion material having higher heat stability may be the first wavelength conversion material.

Meanwhile, as a measure for minimizing the frequency where the light emitted by the second wavelength conversion part (200) proceeds against the light path to arrive the first wavelength conversion part (100), the relative positions of the first wavelength conversion part (100) and the second wavelength conversion part (200) are required to be determined carefully.

For example, the required intensity (lumen) of the surface light source for backlight in commercial LCD is over 5,000 lm/m$^2$. Especially, in the edge type which uses relatively less number of light emitting diodes, the intensity of emitted light as compared to the illuminant areas of the light emitting diodes is required to be 50,000,000 lm/m$^2$ in maximum. Therefore, when the first wavelength conversion part (100) is formed of a sealing member of LED package and the second wavelength conversion part (200) is formed as a film shape arranged at the last end on the light path, the maximum value of a ratio (A2/A1) of the area where the second wavelength conversion part (200) converts and emits the light (that is, an illuminant area (A2)) to the area where the first wavelength conversion part (100) converts and emits the light (that is, an illuminant area (A1)) is 50,000,000/5,000=10,000. This ratio is corresponding to the case where the first wavelength conversion part (100) and the second wavelength conversion part (200) are arranged as far as possible to each other on the light path. The intensity of light converted and emitted by the first wavelength conversion part (100) and the second wavelength conversion part (200) tends to be stronger as the light is closer to the center line of the light path, while to be weaker as the light is farther from the center line of the light path. Thus, each of the illuminant areas (A1, A2) of the first wavelength conversion part (100) and the second wavelength conversion part (200) is defined as an area from a point where the intensity of the light emitted from each of the wavelength conversion parts have the maximum value to an area corresponding to 5% of the maximum value on a surface perpendicular to the light path.

The farther the distance between the first wavelength conversion part (100) and the second wavelength conversion part (200) on the light path is the better. However, because the present disclosure is to be applied to the final complete product, the distance is required to be determined practically in consideration of external factors such as thin size (for televisions), advanced definition, etc. However, the minimum distance between the first wavelength conversion part (100) and the second wavelength conversion part (200) is critically affected by technical factors. These technical factors may be various. However, according to an exemplary embodiment of the present disclosure, the probability where the light emitted by the second wavelength conversion part (200) proceeds to the first wavelength conversion part (100) and is absorbed by the first wavelength material will be the standard.

Figure 11:
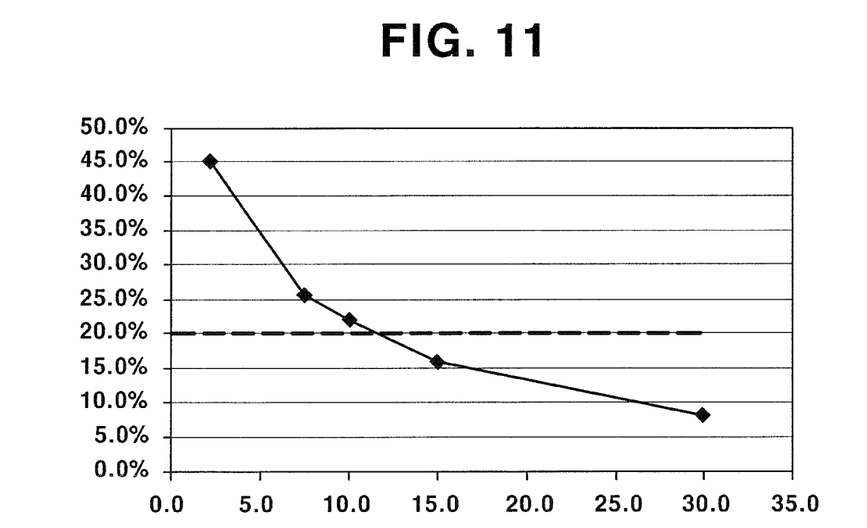
FIG. 11 is a graph illustrating a ratio of an illuminant area of a second wavelength conversion part to an illuminant area of a first wavelength conversion part, and a ratio where the light emitted from the second wavelength conversion part is incident to the first wavelength conversion part, in the first exemplary embodiment of an apparatus of light source for display according to of the present disclosure.

FIG. 11 is a graph illustrating a ratio (A2/A1) of an illuminant area of a second wavelength conversion part to an illuminant area of a first wavelength conversion part, and a ratio where the light emitted from the second wavelength conversion part is incident to the first wavelength conversion part, in the first exemplary embodiment of an apparatus of light source for display according to of the present disclosure. The graph is a result of a simulation measuring the ratio where the light emitted from the second wavelength conversion part (200) is incident to the first wavelength conversion part (100). The ratio of the light incident to the first wavelength conversion part (100) to the light converted by the second wavelength conversion part (200) is generally decreasing as the ratio of illuminant areas (A2/A1) is increasing. Here, when the ratio where the light is incident from the second wavelength conversion part (200) to the first wavelength conversion part (100) is larger than 20%, the light efficiency is declined and the practicality is lowered accordingly. Therefore, the ratio is required to be maintained to be fewer than 20%. This particular point is corresponding to the point where the ratio (A2/A1) of the illuminant area of the second wavelength conversion part (A2) to the illuminant area of the first wavelength conversion part (A1) is 11. Therefore, the minimum value of the ratio (A2/A1) between the illuminant areas of the two wavelength conversion parts may be 11.

The apparatus of light source for display may form an apparatus for display such as an LCD, when a display module (50) is additionally provided.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by the claims.

What is claimed is:

1. An apparatus for display, the apparatus for display comprising:
    a light source module including a light emitting diode configured to generate and emit light;
    a display module;
    a light transmission member configured to decrease a luminous flux per unit area of light from the light emitting diode and emit light to the display module;
    a first wavelength conversion part arranged on a light path from the light emitting diode to the display module to convert a portion of received light to light of a predetermined wavelength and emit converted light; and
    a second wavelength conversion part separately arranged from the first wavelength conversion part on the light path to convert a portion of received light to light of a wavelength different from the predetermined wavelength of the first wavelength conversion part and emit converted light,
    wherein a first plane where the first wavelength conversion part emits light has a first area (A1),
    wherein a second plane where the second wavelength conversion part emits light has a second area (A2), and wherein a ratio of the second area to the first area (A2/A1) is 11~10,000 and wherein the percentage of light incident from the second wavelength conversion part to the first wavelength conversion part is fewer than 20%.

2. The apparatus for display of claim 1, wherein the first wavelength conversion part is arranged on an incident surface side of the light transmission member, and
wherein the second wavelength conversion part is arranged on an emitting surface side of the light transmission member.

3. The apparatus for display of claim 2, further comprising:
an optical sheet to refract or diffuse light by being arranged on an emitting surface of the light transmission member,
wherein the second wavelength conversion part is arranged to either precede or follow the optical sheet on the light path.

4. The apparatus for display of claim 3, wherein a plurality of the optical sheets is provided, and
wherein the second wavelength conversion part is arranged between the plurality of the optical Sheets.

5. The apparatus for display of claim 1, further comprising:
a reflecting member to reflect a light incident from the light transmission member and to emit light to an emitting surface side of the light transmission member by being arranged to face the emitting surface side of the light transmission member,
wherein the first wavelength conversion part is arranged on an incident surface side of the light transmission member, and
wherein the second wavelength conversion part is arranged at a surface of the light transmission member which faces the reflecting member.

6. The apparatus for display of claim 5, wherein the light source module is separately arranged either from an upper or lower surface of the light transmission member,
wherein the first wavelength conversion part is arranged on an emitting surface side of the light source module, and
wherein the second wavelength conversion part is arranged on either an incident or an emitting surface of the light transmission member.

7. The apparatus for display of claim 1, wherein at least one of the first wavelength conversion part and the second wavelength conversion part is a film-shaped member, and
wherein the apparatus for display further includes a protective film coated on at least one surface of the film-shaped member.

8. The apparatus for display of claim 1, wherein the second wavelength conversion part is a coated layer formed on a surface of the light transmission member.

9. The apparatus for display of claim 8, wherein the second wavelength conversion part is divided into a plurality of fragments, and
wherein each fragment of the second wavelength conversion part functions as an optical pattern formed on the light transmission member.

10. The apparatus for display of claim 1, wherein the first wavelength conversion part is arranged on a position on the light path to precede the light transmission member, and
wherein the second wavelength conversion part is arranged on a position on the light path to follow the light transmission member and converts incident light to light of wavelength shorter than the predetermined wavelength of the first wavelength conversion part.

11. The apparatus for display of claim 1, wherein the first and the second wavelength conversion parts include at least one selected from a fluorescent material or a quantum dot.

12. The apparatus for display of claim 11, wherein the fluorescent material includes any one selected from a group consisting of YAG (Yttrium Aluminium Garnet) fluorescent substance, LuAG (Lutetium Aluminium Garnet) fluorescent substance, SiAlON fluorescent substance (such as Alpha SiAlON, Beta and SiALO), Sulfide fluorescent substance, KSF fluorescent substance, Nitride fluorescent substance, Silicate fluorescent substance, and any combination thereof.

13. The apparatus for display of claim 11, wherein the quantum dot includes any one selected from a II-VI group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, CdZnSeS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, HgZnSTe, and any combination thereof, or any one selected from a III-V group consisting of GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNAs, InAlPAs, and any combination thereof.

14. The apparatus for display of claim 1, wherein the light source module further includes a housing mounted with the light emitting diode and formed with a reflector around the light emitting diode, and a circuit board coupled to the housing to apply a current to the light emitting diode, and
wherein the first wavelength conversion part is a sealing member filled in with the reflector.

* * * * *